J. W. Briggs,
Harness Trimming.
Nº 6,518.    Patented June 12, 1849.
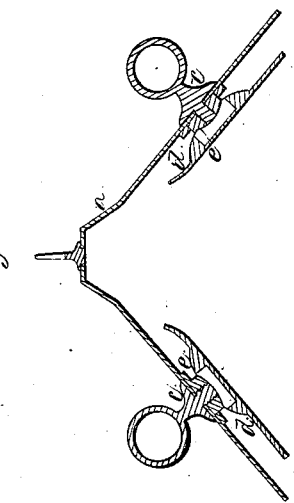
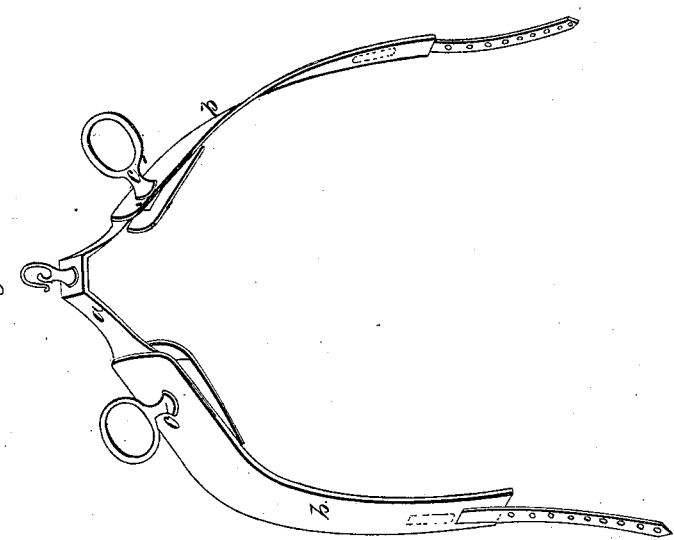

UNITED STATES PATENT OFFICE.

JOS. W. BRIGGS, OF CLEVELAND, OHIO.

HARNESS-SADDLE.

Specification of Letters Patent No. 6,518, dated June 12, 1849.

*To all whom it may concern:*

Be it known that I, Jos W. Briggs, of Cleveland, in the county of Cuyahoga and State of Ohio, have invented certain new and useful Improvements in the Manner of Attaching Pads to Riding and Harness Saddles, of which the following is a full and exact description, reference being had to the annexed drawings of the same, making part of this specification, in which—

Figure 1 is a perspective view of the tree skirts, and girth of a harness saddle having the pads attached by my improved method. Fig. 2 is a vertical section through the middle of the tree terrets and pad, showing the manner in which they are severally formed and connected together.

The same letters indicate the same parts in all the figures.

Harness saddles have heretofore been made with the pads hinged to the tree or yoke that they might so adapt themselves to the varying shapes of the backs of horses as to lay flat thereon, the attainment of the object which this arrangement was designed to accomplish has however in a great measure been prevented by attaching to the pads the skirts and girth, which being strapped tightly around the horse cause the lower end of the pads to bear hard and unequally upon his back, which is thereby unavoidably galled. To remedy this difficulty is the main object of my present invention, and I accomplish it by hinging the pads to the lower ends of the terrets (which project through the tree for that purpose) in such a manner, that they are free to turn upon the axes of their hinges entirely independent of the trees, skirts, or girth, so that their resting flat upon the back of the horse and thereby preventing its being galled is under all circumstances ensured, thus accomplishing what has long been considered a desideratum in harness and other saddles, a self-adjusting pad.

The saddle tree ($a$) represented in the accompanying drawings is made of metal either cast or wrought and of the usual form, its ends being inserted between the outside and the lining of the skirts ($b$) where it is firmly held by the terrets ($c$). The terrets pass through holes made near the ends of the tree, and screw into a block ($e$) which is hinged to the upper side of the pad plate ($d$) in any convenient and suitable manner, thus keeping the parts in their proper relative positions. The pad plate is covered with leather, but as it lays flat upon the back of the horse it requires no stuffing, which renders it so easy of construction that any ordinary workman can make it both lasting and elegant, whereas the stuffed pad can only be made with nicety by accomplished and skillful workmen.

Having thus described my improved harness saddle, what I claim therein as new and desire to secure by Letters Patent is—

Disconnecting the pads from the skirts and girth, when the pads are hinged to and placed far enough beneath the tree to admit of free motion to conform to the shape and changing positions of the horse's back without coming into contact with the skirts or girth, which are attached to the tree as herein set forth.

JOSEPH W. BRIGGS.

Witnesses:
W. Bingham,
H. Belden.